United States Patent
Meng et al.

(10) Patent No.: US 11,835,751 B2
(45) Date of Patent: Dec. 5, 2023

(54) DISPLAY PANEL AND MANUFACTURING METHOD THEREOF, AND DISPLAY DEVICE

(71) Applicant: BOE TECHNOLOGY GROUP CO., LTD., Beijing (CN)

(72) Inventors: Xiandong Meng, Beijing (CN); Jifeng Tan, Beijing (CN); Shuilang Dong, Beijing (CN); Wei Wang, Beijing (CN); Wenqu Liu, Beijing (CN); Wenqing Zhao, Beijing (CN); Qiuyu Ling, Beijing (CN); Xianqin Meng, Beijing (CN); Yishan Tian, Beijing (CN); Zhao Kang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 245 days.

(21) Appl. No.: 17/264,027

(22) PCT Filed: May 25, 2020

(86) PCT No.: PCT/CN2020/092123
§ 371 (c)(1),
(2) Date: Jan. 28, 2021

(87) PCT Pub. No.: WO2020/238856
PCT Pub. Date: Dec. 3, 2020

(65) Prior Publication Data
US 2021/0173137 A1    Jun. 10, 2021

(30) Foreign Application Priority Data
May 30, 2019 (CN) .......................... 201910461203.3

(51) Int. Cl.
G02F 1/1335 (2006.01)
F21V 8/00 (2006.01)
(Continued)

(52) U.S. Cl.
CPC ......... *G02B 6/0093* (2013.01); *G02B 6/0065* (2013.01); *G02F 1/133357* (2021.01);
(Continued)

(58) Field of Classification Search
CPC ................ G02B 6/0093; G02B 6/0065; G02F 1/133615; G02F 1/133524;
(Continued)

(56) References Cited

U.S. PATENT DOCUMENTS 8,189,259 B1    5/2012  Holm et al.
2013/0343524 A1  12/2013  Teshima
(Continued)

FOREIGN PATENT DOCUMENTS

CN    106959481 A      7/2017
CN    107664783 A  *  2/2018  ......... G02B 27/4261
(Continued)

OTHER PUBLICATIONS

First office action issued in Chinese Patent Application No. 201910461203.3 with search report.

*Primary Examiner* — Paisley L Wilson
(74) *Attorney, Agent, or Firm* — Chiwin Law LLC (57) ABSTRACT

A display panel and a manufacturing method thereof, and a display device. The display panel includes a light guide plate, an array substrate, a liquid crystal layer between the light guide plate and the array substrate, a plurality of light-extracting gratings located on one side of a light exit surface of the light guide plate, and a transparent protection layer between a film layer where the light-extracting gratings are located and the light guide plate. The light guide plate includes a plurality of light-extracting port areas, and transparent areas besides the light-extracting port areas; each light-extracting port area is provided with one light-extracting grating; the protection layer is at least provided on the (Continued)

transparent areas, and the protection layer is configured to prevent the light guide plate in the transparent areas from being excessively etched to form a plurality of depressions.

15 Claims, 7 Drawing Sheets (51) Int. Cl.
    *G02F 1/1362*     (2006.01)
    *G02F 1/13357*     (2006.01)
    *G02F 1/1333*     (2006.01)

(52) U.S. Cl.
    CPC .. *G02F 1/133368* (2021.01); *G02F 1/133512* (2013.01); *G02F 1/133524* (2013.01); *G02F 1/133615* (2013.01); *G02F 1/136209* (2013.01); *G02F 2201/07* (2013.01); *G02F 2201/30* (2013.01); *G02F 2201/50* (2013.01)

(58) Field of Classification Search
    CPC ......... G02F 1/133368; G02F 1/136209; G02F 2201/30; G02F 2201/50; G02F 2201/07
    See application file for complete search history.

(56) References Cited

U.S. PATENT DOCUMENTS

2018/0252845 A1     9/2018   Miller et al.
2018/0307054 A1    10/2018   Zha

FOREIGN PATENT DOCUMENTS

| CN | 107664783 A | | 2/2018 | |
|----|---|---|---|---|
| CN | 207882620 U | * | 9/2018 | |
| CN | 207882620 U | | 9/2018 | |
| CN | 109031496 A | | 12/2018 | |
| CN | 109683230 A | | 4/2019 | |
| EP | 3283923 A1 | | 2/2018 | |
| WO | WO-2019200917 A1 | * | 10/2019 | ........... G02B 6/0023 |

* cited by examiner

FIG. 1A

Prior Art

FIG. 1B

Prior Art

FIG. 1C

Prior Art

DISPLAY PANEL AND MANUFACTURING METHOD THEREOF, AND DISPLAY DEVICE

CROSS REFERENCES TO RELATED APPLICATIONS

This application is a U.S. National Phase Entry of International Application No. PCT/CN2020/092123 filed on May 25, 2020, designating the United States of America and claiming priority to Chinese Patent Application No. 201910461203.3 filed on May 30, 2019. The present application claims priority to and the benefit of the above-identified applications and the above-identified applications are incorporated by reference herein in their entirety for all purposes.

TECHNICAL FIELD

Embodiments of the present disclosure relate to a display panel, a manufacturing method of the display panel and a display device.

BACKGROUND

With continuous development of display technology, a new type of display device appears in liquid crystal display (LCD) technology. The backlight module of the display device takes out the light in the light guide plate through the light extraction grating, thereby providing a backlight source for the display panel of the display device.

SUMMARY

Embodiments of the present disclosure provide a display panel, a manufacturing method of the display panel and a display device.

At least one embodiment of the present disclosure provides a display panel, comprising: a light guide plate, an array substrate opposite to the light guide plate, a liquid crystal layer located between the light guide plate and the array substrate, a plurality of light extraction gratings located on a side of a light-emitting surface of the light guide plate, and a transparent protective layer located between a film layer where the light extraction gratings are located and the light guide plate. The light guide plate comprises: a plurality of light extraction port regions, and transparent regions besides the light extraction port regions; each of the light extraction port regions is provided with one of the light extraction gratings, the light extraction gratings are configured to take out light in the light guide plate; the transparent regions are configured to transmit light in the light guide plate by total reflection; and the protective layer is at least arranged in the transparent regions.

For example, the protective layer is an etching barrier layer, and the etching barrier layer has an etching selection ratio greater than an etching selection ratio of the light extraction gratings.

For example, the display panel further comprises: a planarization layer covering each of the light extraction gratings and regions outside the light extraction gratings. The planarization layer is a resin layer; the protective layer has a refractive index greater than a refractive index of the light guide plate; and the planarization layer has a refractive index less than the refractive index of the light guide plate.

For example, the protective layer has a thickness in a range of 0 nm to 400 nm.

For example, the protective layer has a thickness in a range of 0 nm to 60 nm.

For example, the protective layer is a resin layer; and the display panel further comprises: a planarization layer covering each of the light extraction gratings and regions outside the light extraction gratings; the planarization layer has a refractive index less than a refractive index of the light guide plate; and the protective layer has a refractive index same as the refractive index of the planarization layer.

For example, the protective layer made of a material same as a material of the planarization layer.

For example, the refractive index of the protective layer is in a range of 1.2 to 1.3.

For example, the protective layer has a thickness in a range of 0 nm to 10 nm.

For example, the display panel further comprises a light shielding layer. The light shielding layer is located on a side of the array substrate near the liquid crystal layer, the light shielding layer comprises a plurality of light shielding units, and the light shielding units correspond to the light extraction gratings one by one, and the light shielding units are configured to shield light emitted from light-emitting surfaces of the light extraction gratings when no voltage is applied to the liquid crystal layer.

At least one embodiment also provides a method of manufacturing the display panel, comprising: providing a light guide plate, the light guide plate comprises: a plurality of light extraction port regions, and transparent regions besides the light extraction port regions; forming a protective layer at least covering the transparent regions on a side of the light-emitting surface of the light guide plate; forming a grating film layer in the light extraction port regions and the transparent regions on a side of the protective layer facing away from the light guide plate; and patterning the grating film layer, removing a portion of the grating film layer located in the transparent regions, and retaining a portion of the grating film layer located only in the light extraction port regions as a light extraction grating.

For example, the protective layer is an etching barrier layer. The forming the protective layer at least covering the transparent regions on the side of the light-emitting surface of the light guide plate comprises: using a material with an etching selection ratio greater than an etching selection ratio of the light extraction grating, and forming the etching barrier layer covering at least the transparent regions on a side of the light-emitting surface of the light guide plate. The forming the grating film layer in the light extraction port regions and the transparent regions on the side of the protective layer facing away from the light guide plate comprises: forming the grating film layer in the light extraction port regions and the transparent regions on the side of the etching barrier layer away from the light guide plate. The patterning the grating film layer, removing the portion of the grating film layer located in the transparent regions, and retaining the portion of the grating film layer located only in the light extraction port regions as the light extraction grating comprises: using a mask to shield the portion of the grating film layer located in the light extraction port regions, and removing the portion of the grating film layer located in the transparent regions by using an etching process. The manufacturing method further comprises: after patterning the grating film layer, using a resin material to form the etching barrier layer covering the transparent regions and the planarization layer covering each of the light extraction gratings.

For example, the protective layer is a resin layer; the forming the protective layer at least covering the transparent regions on the side of the light-emitting surface of the light guide plate comprises: using a resin material to form a resin layer covering at least the transparent regions on the side of the light-emitting surface of the light guide plate. The forming the grating film layer in the light extraction port regions and the transparent regions on the side of the protective layer facing away from the light guide plate comprises: forming a grating film layer in the light extraction port regions and the transparent regions on a side of the resin layer facing away from the light guide plate. The patterning the grating film layer, removing the portion of the grating film layer located in the transparent regions, and retaining the portion of the grating film layer located only in the light extraction port regions as the light extraction grating comprises: using a mask to shield the portion of the grating film layer located at the light extraction port regions, using an etching process to remove the portion of the grating film layer located in the transparent regions, and forming a plurality of grooves on a surface of the resin layer during the etching process. The manufacturing method further comprises: after patterning the grating film layer, using a material with a same refractive index as the resin layer to form a planarization layer on the side of the light extraction grating facing away from the light guide plate to fill each of the grooves.

At least one embodiment also provides a display device, comprising the display panel.

BRIEF DESCRIPTION OF THE DRAWINGS

Embodiments of the present disclosure will be described in more detail below with reference to accompanying drawings to allow an ordinary skill in the art to more clearly understand embodiments of the present disclosure, in which:

FIG. 4 is a schematic diagram of a relationship curve between a brightness change ratio of a display panel and a thickness H1 of a protective layer 203a;

DETAILED DESCRIPTION

The technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms, such as "first," "second," or the like, which are used in the present application, are not intended to indicate any sequence, amount or importance, but for distinguishing various components. Also, the terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the absolute position of the object which is described is changed, the relative position relationship may be changed accordingly.

Figure 1A:
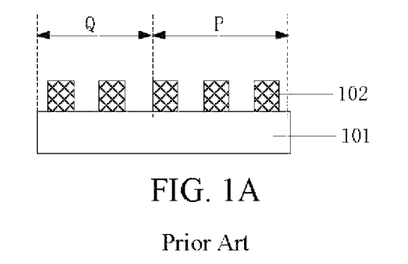
FIGS. 1A and 1B are partial schematic diagrams of corresponding display panels in a manufacturing process of light extraction gratings.
Figure 1B:
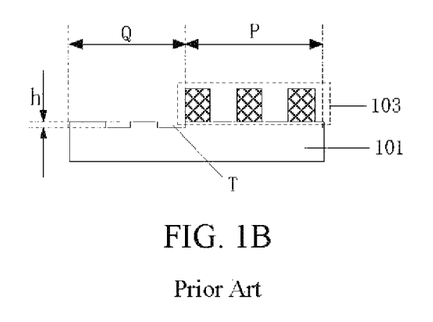

During a manufacturing process of a light extraction grating, an entire grating film layer 102 is formed on the light guide plate 101 firstly, as shown in FIG. 1A. Then a mask is used to block a light extraction port region P, a portion of the grating film layer 102 located in a transparent region Q is etched away by an etching process, so that the grating film layer 102 is patterned, as shown in FIG. 1B, a light extraction grating 103 is formed in the light extraction port region P. Due to the grating preparation process, in the process of forming the grating film layer 102 or in the process of patterning the grating film layer 102, the light guide plate 101 in the transparent region Q is inevitably etched, as shown in FIG. 1B, the light guide plate 101 in the transparent region Q is etched into a plurality of pits T, so that a part of light in the light guide plate 101 is emitted at the transparent region Q, which directly causes a display contrast of the display device to decrease.

Figure 1C:
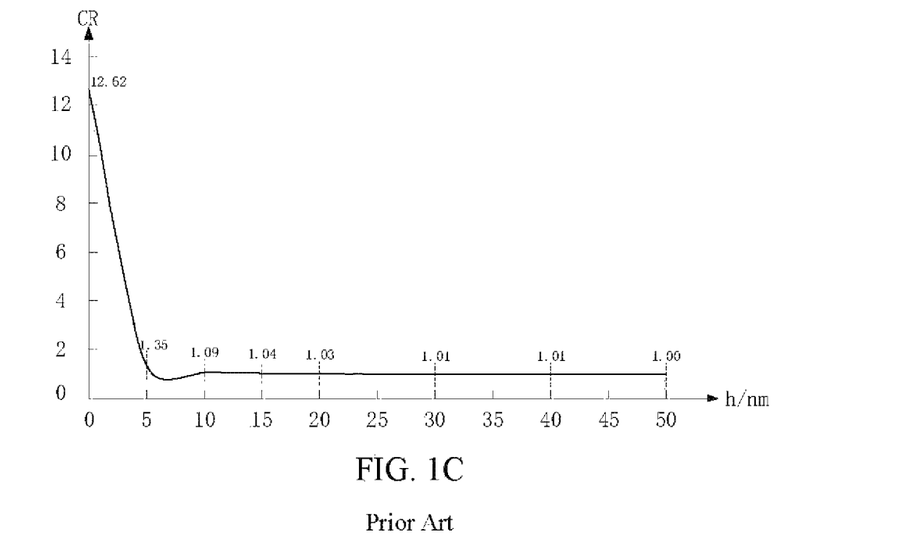
FIG. 1C is a schematic diagram of a relationship curve between a display contrast CR and an etch depth h of a pit T.

The greater the depth h of the pits T etched in the transparent region Q of the light guide plate 101, the lower the display contrast of the display device is. FIG. 1C is the relationship curve between the display contrast CR and the etching depth h of the pits T. Referring to 1C, it can be clearly seen that, in a case that the depth value h of the pits T is in the range of 0 nm to 5 nm, the display contrast CR drops rapidly. In a case that the depth value h of the pits T exceeds 5 nm, the display contrast CR decreases to about 1. Therefore, the pits T etched in the transparent region Q of the light guide plate 101 greatly affect the display contrast CR.

An embodiment of the present disclosure provides a display panel, a manufacturing method of the display panel, and a display device, which can solve the problem of the reduced display contrast of the display device.

In the following, with reference to the accompanying drawings, the exemplary implementations of the display panel, the manufacturing method of the display panel, and the display device provided by the embodiments of the present disclosure will be described in detail. The thickness and the shape of each of the film layers in the drawings do not reflect true scales, and the purpose is only to illustrate the content of the present disclosure.

Figure 2A:
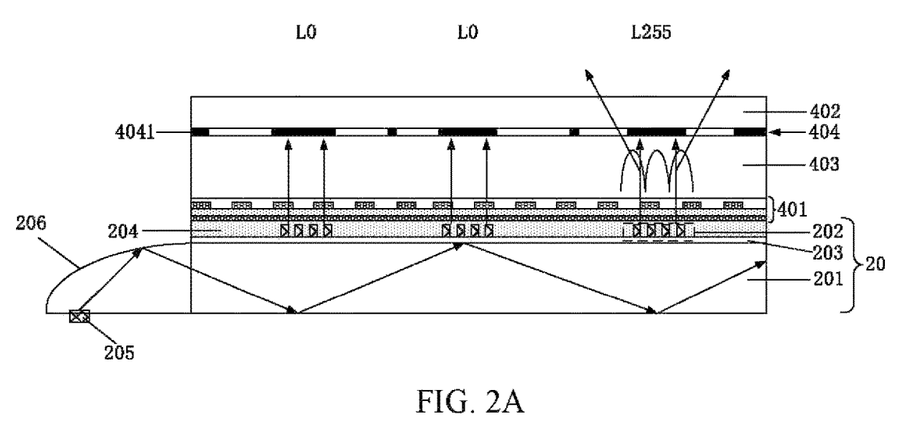
FIG. 2A is a first schematic diagram of a display panel provided by an embodiment of the present disclosure.
Figure 2B:
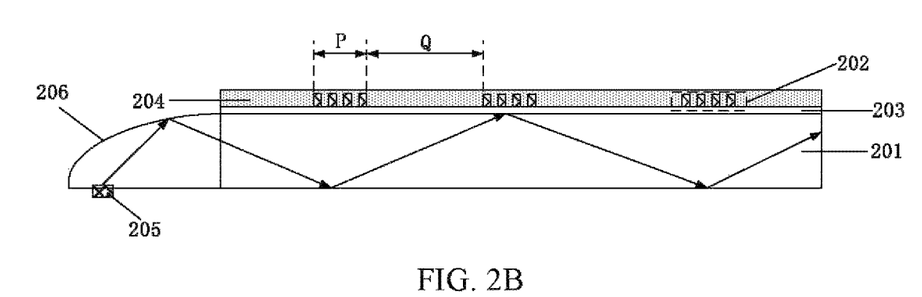
FIG. 2B is a second schematic diagram of a display panel provided by an embodiment of the present disclosure.

An embodiment of the present disclosure provides a display panel, and FIG. 2A is a schematically structural diagram of the display panel provided by the embodiment of the present disclosure, FIG. 2B is a partial schematic diagram of FIG. 2A. As shown in FIG. 2A and FIG. 2B, the display panel includes: a light guide plate 201, an array substrate 402 disposed opposite to the light guide plate 201, a liquid crystal layer 403 located between the light guide plate 201 and the array substrate 402, a plurality of light extraction gratings 202 located on a side of the light-emitting surface of the light guide plate 201 (an upper side in the figure is the light-emitting surface as an example), and a transparent protective layer 203 located between the film layer where the light extraction grating 202 is located and the light guide plate 201.

The light guide plate 201 includes a plurality of light extraction port regions P, and transparent regions Q besides the light extraction port regions P; a light extraction grating 202 is provided in each of the light extraction port regions P, the light extraction grating 202 is configured to take out the light in the light guide plate 201; the transparent regions Q are configured to transmit light in the light guide plate by total reflection; at least the transparent regions Q are provided with a protective layer 203 configured to prevent over-etching.

In the display panel provided by the embodiment of the present disclosure, by arranging a protective layer between the film layer where the light extraction grating is located and the light guide plate, in the process of forming a patterned light extraction grating by using an etching process, the protective layer protects the light guide plate, so that the loss of light energy caused by the etching of the light guide plate can be avoided, and the display contrast is increased; moreover, because the protective layer is transparent, the protective layer does not affect the normal light emission of the display panel.

For example, a light source 205 is provided on a side surface of the light guide plate 201 (opposite to an end surface facing the light-emitting surface of the array substrate), and the light source 205 can provide a certain angle of light for the light guide plate 201. For example, the light source 205 can be a monochromatic light emitting diode (LED). In order to make the light source 205 have a higher collimation, an LED with a smaller size can be used, for example, a micro-LED or a micro-OLED can be used, or a laser light source is used; however, the embodiments of the present disclosure are not limited thereto. A reflective cover 206 can also be arranged on a side of the light guide plate 201, and the reflective cover 206 is arranged at a position corresponding to the light source 205, the reflective cover 206 can couple the light emitted by the light source 205 into the light guide plate 201.

The light guide plate 201 is a total reflection transmission structure, the light satisfies a condition of total reflection can propagate through total reflection in the light guide plate 201, an incident angle of the light from the light source 205 to the light guide plate can be designed, so that most of the light entering the light guide plate 201 can meet the total reflection condition. In addition, in order to ensure the light transmittance of the display panel, the light guide plate 201 needs to have a high transparency; moreover, in order to prevent the light from being scattered or absorbed, the light guide plate 201 needs to have a low haze, at the same time, it is also necessary to ensure the flatness of the upper and lower surfaces of the light guide plate 201, for example, the light guide plate is made of glass material.

By arranging the light extraction grating 202 on a side of the light-emitting surface of the light guide plate 201, in the case that the light propagating through total reflection in the light guide plate 201 is directed to the light extraction grating 202, the light can be diffracted and extracted at a specific angle at the light extraction grating 202, and the light can still propagate through total reflection in regions except the light port regions P (that is, the transparent regions Q). A plurality of light extraction gratings 202 are respectively located at the position of each of the light extraction port regions P, and the plurality of the light extraction gratings 202 are arranged in a dot matrix, so that light is emitted in a dot matrix form on the side of the light-emitting surface of the light guide plate 201. For example, by setting optical parameters of the light extraction gratings 202, exit angles of the light emitted at the light extraction port region P can be adjusted. For example, by setting grating parameters of the light extraction gratings 202, the light can be collimated and emitted at the light extraction gratings 202. For example, the light extraction gratings 202 can be made of a transparent material, for example, the light extraction gratings 202 can be made of a material with a higher refractive index.

In an embodiment of the present disclosure, by arranging a protective layer 203 between the film layer where the extraction gratings 202 is located and the light guide plate 201, the light guide plate 201 can be prevented from being etched during the etching process, and the protective layer 203 for preventing over-etching is arranged at least in the transparent regions Q. For example, without affecting a light extraction performance of the light extraction port region P, the protective layer 203 can also be made as an entire layer, so that the process of patterning the protective layer 203 is saved, and the cost of patterning the protective layer 203 is saved. In the embodiments of the present disclosure, the protective layer 203 is provided as an entire layer for description. For example, the protective layer 203 can be implemented in multiple ways, and the protective layer 203 can protect the light guide plate 201 from being etched.

The implementation ways of the protective layer 203 will be described in detail below with reference to the drawings.

Figure 3:
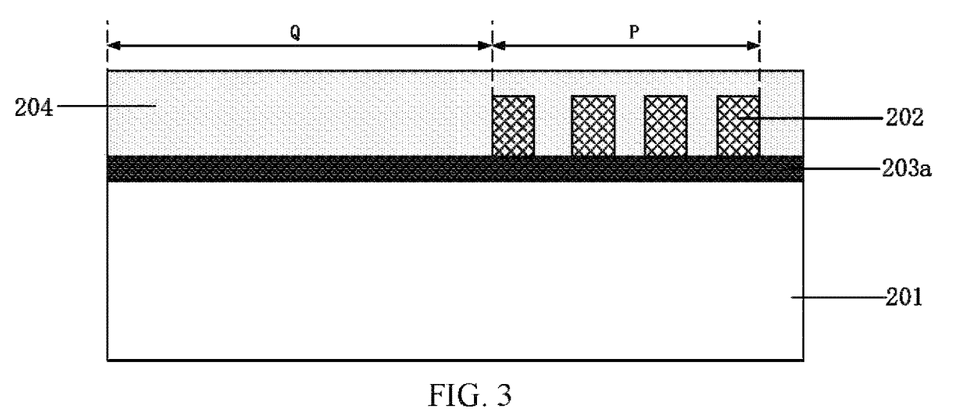
FIG. 3 is a third schematic diagram of a display panel provided by an embodiment of the present disclosure.

In FIG. 3, the protective layer in a first way is represented by 203a. As shown in FIG. 3, the protective layer 203a is an etching barrier layer, and an etching selection ratio of the etching barrier layer is greater than an etching selection ratio of the light extraction gratings 202. The etching selection ratio represents the relative etching rate of one material to another material under same etching conditions. The higher the etching selection ratio of a material, the less easily the material is etched. Therefore, by using the etching barrier layer having a high etching selection ratio relative to the light extraction gratings 202, during the etching process, the etching barrier layer is less likely to be etched compared to the light extraction gratings 202, so as to play a role of preventing over-etching, the transparent regions Q of the light guide plate 201 are prevented from being etched, and the light-locking ability of the light guide plate 201 located in the transparent regions Q are fully guaranteed. To allow the etching barrier layer not to be etched, the etching selection ratio of the etching barrier layer can be set to be much larger than the etching selection ratio of the light extraction grating 202. For example, the light extraction grating 202 can be made of silicon nitride (SiNx) material, and the etching barrier layer can be made of materials, such as indium tin oxide (ITO), and indium gallium zinc oxide (IGZO).

For example, the above-mentioned display panel provided by the embodiment of the present disclosure, as shown in FIG. 3, further includes: a planarization layer 204 covers each of the light extraction gratings 202 and the region outside the light extraction gratings 202, and the planarization layer 204 is a resin layer.

A refractive index of the protective layer 203a is greater than a refractive index of the light guide plate 201. A refractive index of the planarization layer 204 is less than the refractive index of the light guide plate 201.

By using the protective layer 203a made of a high refractive index material with a high etching selection ratio, it can further prevent the protective layer 203a from being etched. In addition, the refractive index of the planarization layer 204 is less than the refractive index of the light guide plate 201, so that the light transmitted from the light guide plate 201 can meet the transmission condition of total reflection from an optical denser medium to an optical thinner medium, and the light can be totally reflected at the interface between the protective layer 203a and the planarization layer 204.

For example, to avoid affecting the light extraction effect of the display panel, the protective layer 203a can be made of a transparent material, for example, the protective layer 203a can be made of a transparent metal oxide material, such as indium tin oxide (ITO).

For example, the planarization layer 204 is located on a side of the light extraction gratings 202 away from the light guide plate 201, the planarization layer 204 can cover each of the light extraction gratings 202 and fills the region except the regions for the light extraction gratings 202, and fills each of the transparent regions Q and the light transmission regions of the light extraction gratings 202 in the light extraction port regions P, so that the film layer where the light extraction gratings 202 is located is planarized.

For example, to avoid affecting the light extraction effect of the display panel, the thickness of the protective layer 203a cannot be too large, and the thickness of the protective layer 203a can be in a range of 0 nm to 400 nm.

Figure 4:
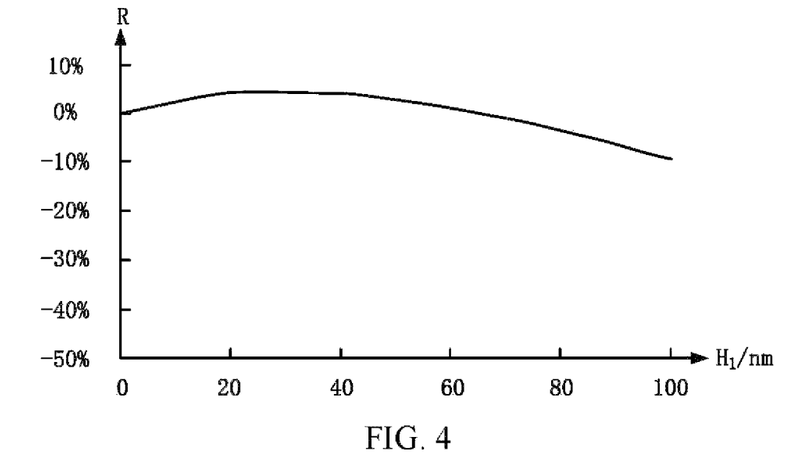

FIG. 4 is a relationship curve between a brightness change ratio of a display panel and a thickness H1 of a protective layer 203a, and the effect of different thicknesses of the protective layer 203a on the light extraction effect of the light extraction port regions can be seen from FIG. 4. For example, the thickness of the protective layer 203a can be in a range of 0 nm to 60 nm, which has no effect on the brightness of the light extraction port region, in the case that the thickness of the protective layer 203a is greater than 60 nm, the brightness of the light extraction port region is less decreased, so that the feasibility of the first approach is proved, that is, by arranging the protective layer 203a between the light guide plate 201 and the film layer where the light extraction gratings 202 is located, the light guide plate 201 can be protected without affecting the light extraction effect, so that the light guide plate 201 in the non-light extraction port region Q is not etched.

Figure 5:
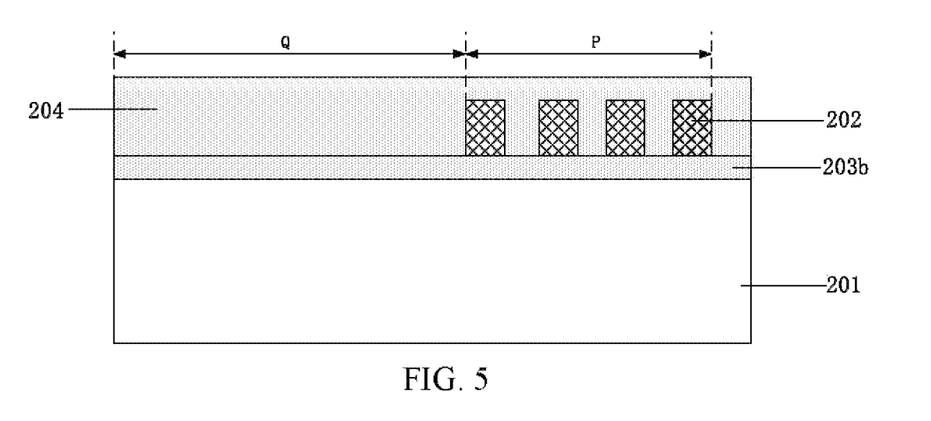
FIG. 5 is a fourth schematic diagram of a display panel provided by an embodiment of the present disclosure.

To distinguish the protective layer in the second way from the protective layer in the first way, the protective layer in the second way is represented by 203b in FIG. 5. As shown in FIG. 5, in the above-mentioned display panel provided by an embodiment of the present disclosure, the protective layer 203b is a resin layer; and the above-mentioned display panel can further include: a planarization layer 204 covers the light extraction gratings 202 and a region outside the light extraction gratings 202.

The refractive index of the planarization layer 204 is less than the refractive index of the light guide plate 201.

The refractive index of the protective layer 203b is the same as the refractive index of the planarization layer 204.

The refractive index of the planarization layer 204 is less than the refractive index of the light guide plate 201, so that the light transmitted from the light guide plate 201 can meet the transmission condition of total reflection from an optical denser medium to an optical thinner medium. In addition, the planarization layer 204 is located on a side of the light extraction gratings 202 away from the light guide plate 201, the planarization layer 204 can cover the light extraction gratings 202 and fills the region except the regions of the light extraction gratings 202, and can fill each of the transparent regions Q and a light transmission region of each of the light extraction gratings 202 in the light extraction port region P, so that the film layer where the light extraction gratings 202 are located is planarized.

By using a protective layer 203b made of a material having the same refractive index as the planarization layer 204, and after each of the light extraction gratings 202 is formed by the etching process, the protective layer 203b located in the transparent regions Q may be etched to generate some grooves, when the planarization layer 204 is formed, the planarization layer 204 fills the grooves on the protective layer 203b, so that the surface of the protective layer 203b is flattened again, to enable the light-locking ability of the transparent regions Q.

For example, the material of the protective layer 203b is the same as the material of the planarization layer 204. In addition, the protective layer 203b has the same refractive index as the planarization layer 204, and the material of the protective layer 203b is different from the material of the planarization layer 204, for example, the protective layer 203b and the planarization layer 204 can be made of organic materials, such as organosiloxane, and the embodiments of the present disclosure are not limited thereto.

For example, in the above-mentioned display panel provided by the embodiment of the present disclosure, the refractive index of the protective layer 203b can be in a range of 1.2 to 1.3, and the refractive index of the light guide plate 201 can be in a range of 1.5 to 2.0.

In order not to decrease the light extraction brightness at the light extraction port region P and keep the overall light output brightness of the display panel, the protective layer 203b between the light guide plate 201 and the film layer where the light extraction gratings 202 are located needs to be very thin, for example, the thickness of the protective layer 203b is in a range of 0 nm to 10 nm.

However, Because the protective layer 203b is less than about 10 nm, the interface between the light guide plate 201 and the protective layer 203b in the transparent regions Q does not have the light-locking ability, such that the light in the light guide plate 201 may be emitted out from the transparent regions Q, it is needed to form a planarization layer 204 with the same refractive index as the protective layer 203b on the protective layer 203b, the thickness of the planarization layer 204 needs to be greater than about 1 μm, so that the interface between the light guide plate 201 and the protective layer 203b located in the transparent regions Q has the light-locking ability, and in the transparent regions Q, the light is totally reflected at the interface between the light guide plate 201 and the protective layer 203b and the light cannot be emitted out. In this way, the protective layer 203b in the second way can guarantee the light extraction brightness of the light extraction port region P, and the protective layer 203b in the second way can protect the light guide plate 201 on the basis of enabling the light-locking ability in the transparent regions to prevent the light guide plate 201 from being etched during the etching process.

Figure 6:
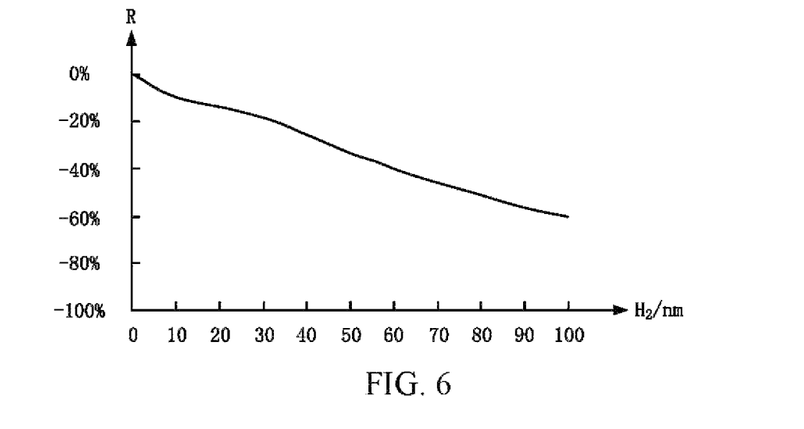
FIG. 6 is a schematic diagram of a relationship curve between a brightness change ratio of a display panel and a thickness H2 of a protective layer 203b.

FIG. 6 is a relationship curve between a brightness change ratio of a display panel and a thickness H2 of a protective layer 203b, and the effect of different thicknesses of the protective layer 203b on the light extraction effect of the light extraction port regions can be seen from FIG. 6. For example, in a case that the thickness of the protective layer 203b is less than 10 nm, the brightness change of the light extraction port region is less than 10%, therefore, it can be proved that the protective layer 203b has little effect on the light extraction effect of the light extraction port region, so that the feasibility of the protective layer 203b in the second way is proved.

For example, the above-mentioned display panel provided by the embodiment of the present disclosure, as shown in FIG. 2A, the display panel further includes a light shielding layer 404. The light shielding layer 404 is located on a side of the array substrate 402 near the liquid crystal layer 403. The light shielding layer 404 includes a plurality of light shielding units 4041, the light shielding units 4041 correspond to the light extraction gratings 202 one by one, and the light shielding units 4041 are configured to shield light emitted from light-emitting surfaces of the light extraction gratings 202 when no voltage is applied to the liquid crystal layer 403.

For example, the light shielding layer 404 is a black matrix.

Referring to FIG. 2A, when no voltage is applied to the liquid crystal layer 403, the liquid crystal layer 403 has no deflection effect on light, the light directed to the liquid crystal layer 403 can be transmitted along the original direction. In this way, when no voltage is applied to the liquid crystal layer 403, the light emitted from the light extraction gratings 202 is directed to the corresponding light shielding unit 4041, and the light can be absorbed by the light shielding units 4041 and cannot be exited out, for example, as for the situation of the light extraction gratings 202 on the left and at the middle in FIG. 2A, so as to achieve a completely dark state of zero gray level L0. In order to have a sufficient brightness directly in front of the display device, the light extraction gratings 202 are generally designed to emit the collimated light. In order to enable the light shielding units 4041 to shield the light emitted by the corresponding light extraction gratings 202, orthographic projections of the light shielding units 4041 on the light guide plate 201 should be able to cover orthographic projections of the light-emitting ports of the light extraction gratings 202 on the light guide plate 201 respectively.

After a driving voltage is applied to the liquid crystal layer 403, the liquid crystal molecules in the liquid crystal layer 403 are deflected to form liquid crystal gratings, and the liquid crystal gratings can scatter the light emitted by the light extraction gratings 202, so that the light can deviate from the light shielding units 4041 and be emitted out, and a bright state is achieved, as the region of the light extraction gratings 202 on the right in FIG. 2A is in the bright state of gray scale L255. Depending on different driving voltages, the light effects of the liquid crystal gratings are different, so that the energies of the light emitted and deviated from the light shielding units 4041 are different, and the gray-scale modulation display is realized.

For example, a pixel electrode layer and a common electrode layer can be arranged for applying a driving voltage to the liquid crystal layer. As shown in FIG. 2A, the Advanced Super Dimension Switch (ADS) mode is used, the pixel electrode layer and the common electrode layer (the two darker films in the electrode layer 401 in FIG. 2A) are arranged on the same side of the liquid crystal layer 403, the fringe field effect is used to realize the control of the liquid crystal gratings. Or, other drive modes can be used, for example, the pixel electrode layer and the common electrode layer are arranged on two sides of the liquid crystal layer, however, the embodiments of the present disclosure are not limited thereto. In addition, in order to decrease the thickness of the display device, film layers, such as the pixel electrode layer, and the common electrode layer, can be directly formed on the planarization layer 204.

For example, to improve light efficiency, the liquid crystal layer can include liquid crystal molecules with high refractive index difference (Δn). The above-mentioned opposite substrate 402 can be a glass substrate with high transparency, and the flatness of the surface of the glass substrate is good.

Based on the same concept, an embodiment of the present disclosure also provides a method of manufacturing the above-mentioned display panel. Because the principle of the manufacturing method to solve the problem is similar to the above-mentioned display panel, the implementation of the manufacturing method can refer to the implementation of the above-mentioned display panel, and the similar contents are not repeated.

Figure 7:
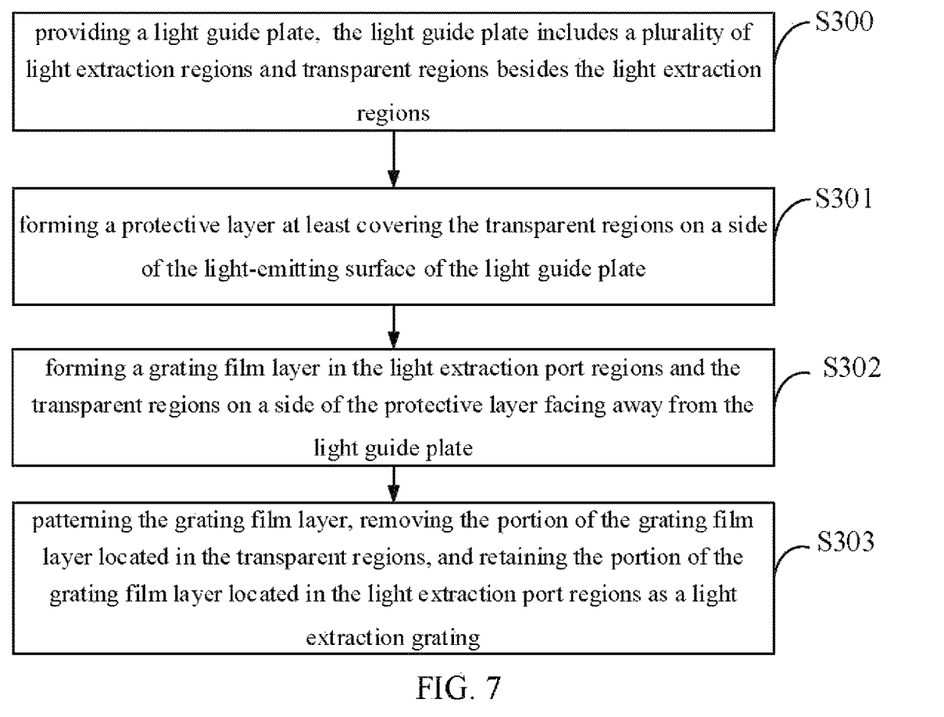
FIG. 7 is a flowchart of a manufacturing method of the above-mentioned display panel provided by an embodiment of the present disclosure.

As shown in FIG. 7, the method of manufacturing the above-mentioned display panel provided by the embodiment of the present disclosure includes following operations.

S300, providing a light guide plate, and the light guide plate includes a plurality of light extraction regions and transparent regions besides the light extraction regions;

S301, forming a protective layer at least covering the transparent regions on a side of the light-emitting surface of the light guide plate;

S302, forming a grating film layer in the light extraction port regions and the transparent regions on a side of the protective layer facing away from the light guide plate;

S303, patterning the grating film layer, removing the portion of the grating film layer located in the transparent regions, and retaining the portion of the grating film layer located in the light extraction port regions as light extraction gratings.

In the above-mentioned manufacturing method provided by the embodiments of the present disclosure, before the grating film layer is patterned, a protective layer is formed on the side of the light-emitting surface of the light guide plate. In this way, in the process of patterning the grating film layer, the protective layer can protect each region of the light guide plate, so that the loss of light energy caused by the etching of the light guide plate can be avoided, and the contrast of the display is improved; moreover, because the protective layer is transparent, the protective layer will not affect the normal light emission of the display panel.

In the following, in conjunction with the accompanying drawings, a detailed description of the manufacturing method corresponding to the above first way is given, that is, the manufacturing method corresponding to the protective layer being the etching barrier layer will be described.

Figure 8A:
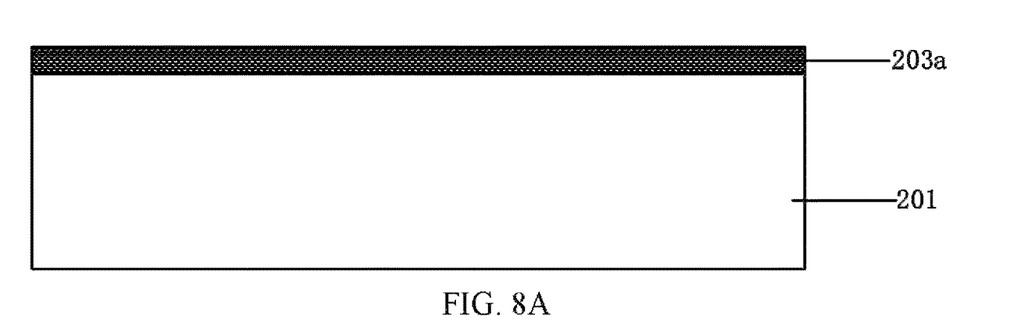
FIG. 8A to FIG. 8D are structural schematic diagrams of each step in the manufacturing method corresponding to the first way.

As shown in FIG. 8A, the above step S301 can include: using a material with an etching selection ratio greater than an etching selection ratio of the light extraction gratings, and forming the etching barrier layer 203a covering at least the transparent regions on a side of the light-emitting surface of the light guide plate 201.

Figure 8B:
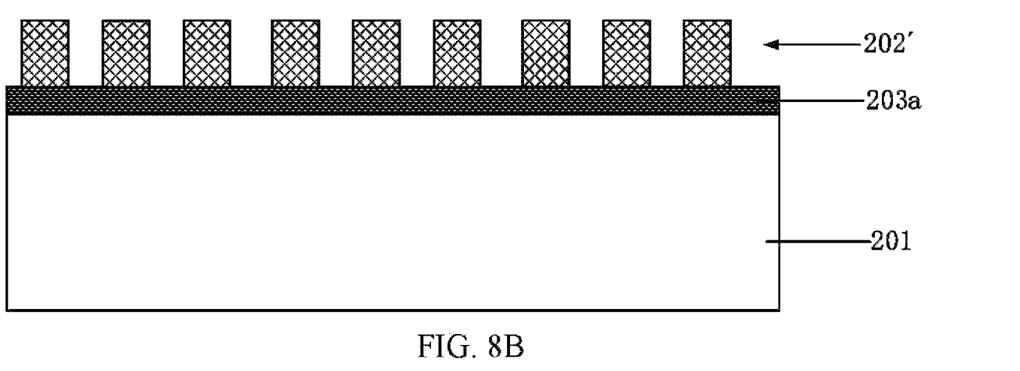

As shown in FIG. 8B, the above step S302 can include: forming a grating film layer 202' in the light extraction port regions and the transparent regions on the side of the etching barrier layer 203a away from the light guide plate 201. For example, a plurality of processes, such as nanoimprinting process, and etching process, can be used to form the grating film layer. In the process of forming the grating film layer 202', because the etching selection ratio of the protective layer 203a is relatively high, the protective layer 203a is not easily etched, and the flatness of the surface of the protective layer 203a can be maintained.

Figure 8C:
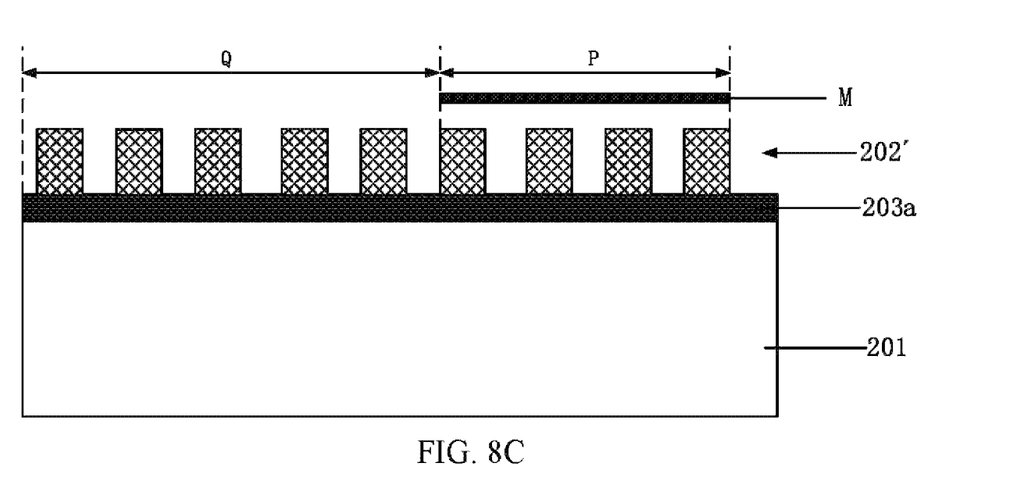
Figure 8D:
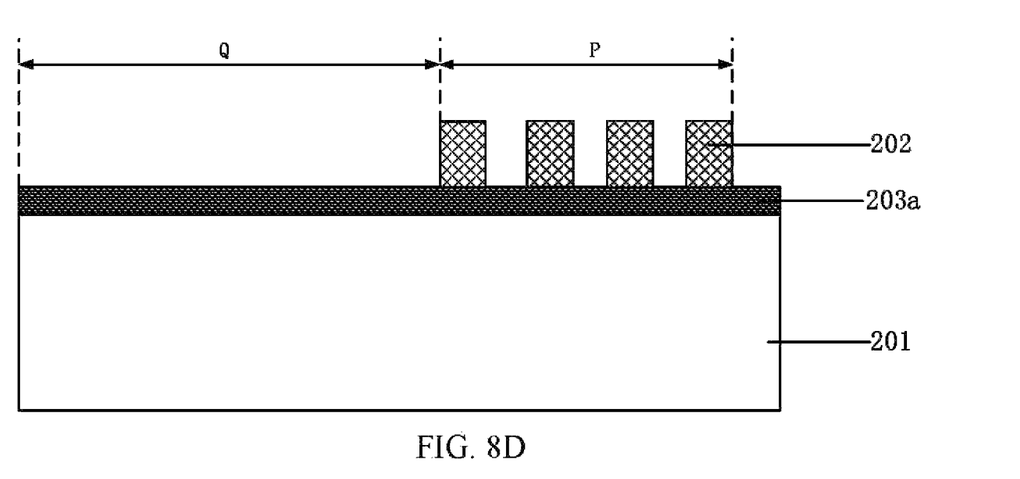

As shown in FIG. 8C, the above step S303 can include: using a mask M to block the grating film layer 202' located in the light extraction port regions P, and removing the portion of the grating film layer 202' in the transparent regions Q by the etching process. Because the etching selection ratio of the protective layer 203a is relatively high, and the refractive index of the protective layer 203a is relatively high, the surface of the protective layer 203a is not easily etched during the etching process, so that the structure shown in FIG. 8D is obtained. Due to the protective effect of the protective layer 203a, the light guide plate 201 will not be etched, and the protective layer 203a is not easily etched during the etching process. In this way, the flatness of the surface of the light guide plate 201 and the flatness of the surface of the protective layer 203a can be higher, and the optical effect of the display panel is better.

After the above step S303, the above manufacturing method may further include: using the resin material to form the etching barrier layer covering the transparent regions and the planarization layer 204 covering the light extraction gratings 202, that is, the structure shown in FIG. 3 can be obtained.

In the following, in conjunction with the accompanying drawings, a detailed description of the manufacturing method corresponding to the above first way is given, that is, the manufacturing method corresponding to the protective layer being the resin layer will be described.

Figure 9A:
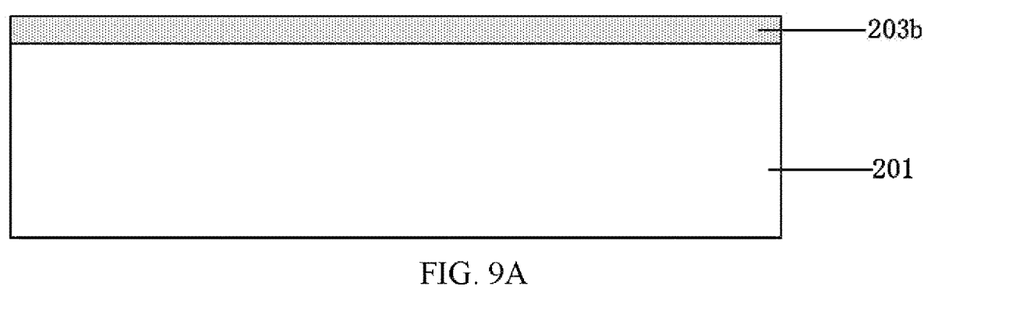
FIG. 9A to FIG. 9D are structural schematic diagrams of each step in the manufacturing method corresponding to the second way.

As shown in FIG. 9A, the above step S301 can include: using the resin material to form a resin layer 203b at least covering the transparent region on the side of the light emitting surface of the light guide plate 201.

Figure 9B:
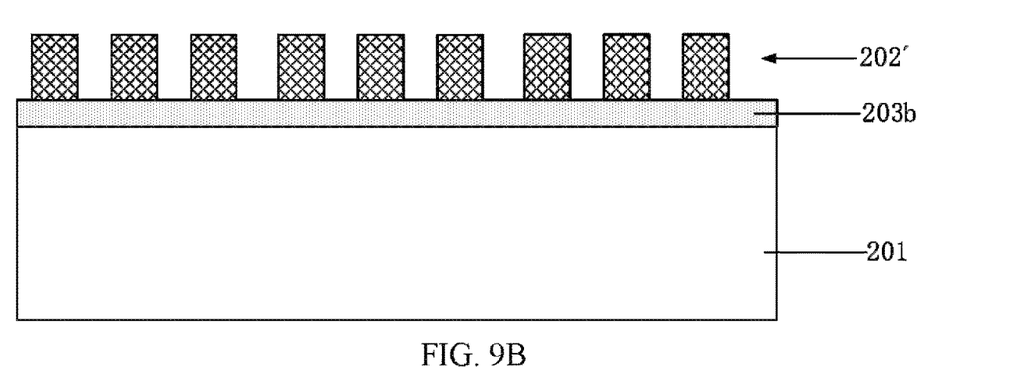

As shown in FIG. 9B, the above step S302 can include: forming a grating film layer 202' on the light extraction region and the transparent region on the side of the resin layer 203b away from the light guide plate 201. For example, a plurality of processes, such as nanoimprinting, and etching, can be used to fabricate the grating film layer. In the process of manufacturing the grating film layer 202', the protective layer 203b at the gaps between the grating stripes of the grating film layer 202' may be etched.

Figure 9C:
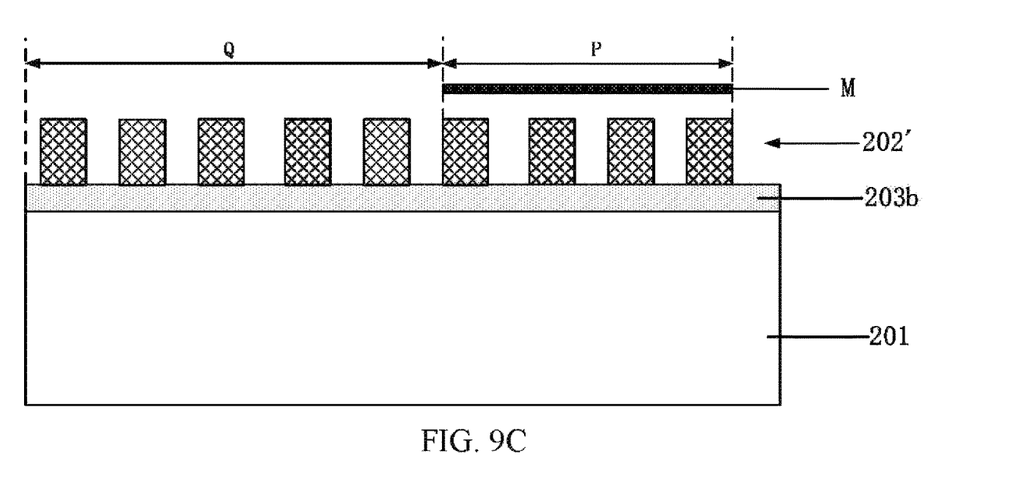
Figure 9D:
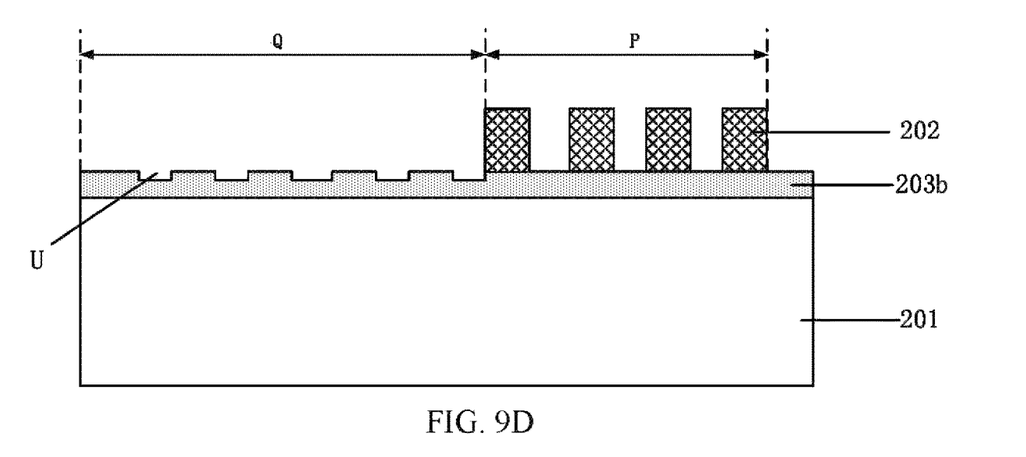

As shown in FIG. 9C, the above step S303 further includes: using the mask M to block the grating film layer 202' in the light extraction region P, using an etching process to remove the grating film layer 202' in the transparent region Q, and possibly forming a plurality of grooves on the surface of the resin layer 203b. As shown in FIG. 9D, during the etching process, the surface of the protective layer 203b is easily etched, so that a plurality of grooves U are formed on the surface of the protective layer 203b.

After the above step S303, the above manufacturing method further includes: by using a material with the same refractive index as the resin layer 203b, forming a planarization layer 204 on the side of the light extraction grating 202 away from the light guide plate 201 to fill the grooves U to obtain the structure shown in FIG. 5.

Because the planarization layer 204 can fill the grooves U on the protective layer 203b, the surface of the protective layer 203b is flatted again, which enable the light-locking ability of the transparent region Q. In addition, in order to enable the light extraction brightness of the light extraction port region P not to be decreased, the protective layer 203 needs to be very thin, however, if the protective layer 203b is very thin, the light-locking ability of the transparent region Q is weaker; therefore, after the etching process, the planarization layer 204 with the same refractive index as the protective layer 203b is formed, on the one hand, a planarization effect can be achieved, in addition, the light-locking ability of the interface between the light guide plate 201 and the protective layer 203b in the transparent region Q can also be improved, which enable the light in the light guide plate 201 not to be emitted in the transparent region Q.

Based on the same concept, an embodiment of the present disclosure also provides a display device, and the display device includes the display panel. Because the principle of solving the problem of the display device is similar to the above-mentioned display panel, the implementation of the display device can refer to the implementation of the above-mentioned display panel, and the similar content will not be repeated. The display device can be applied to any products or components with a display function, such as a mobile phone, a tablet computer, a television, a monitor, a notebook computer, a digital photo frame, a navigator, and so on. In addition, the display device can also be used in the fields of Virtual Reality (VR) display, Augmented Reality (AR) display, transparent display, directional display, and color display.

In the display panel, the manufacturing method of the display panel, and the display device provided by the embodiments of the present disclosure, by arranging a protective layer between the film layer where the light extraction gratings are located and the light guide plate, in the process of forming a patterned light extraction grating by using an etching process, the protective layer can protect the light guide plate, so that the loss of light energy caused by the etching of the light guide plate can be avoided, the display contrast is increased. In addition, because the protective layer is transparent, the protective layer will not affect the normal light emission of the display panel.

In the display panel, the manufacturing method of the display panel, and the display device provided by the embodiments of the present disclosure, the display panel includes: a light guide plate, an array substrate arranged oppositely to the light guide plate, a liquid crystal layer located between the light guide plate and the array substrate, a plurality of light extraction gratings located on a side of the light-emitting surface of the light guide plate, and a transparent protective layer located between the film layer where the light extraction gratings are located and the light guide plate; the light guide plate includes: a plurality of light extraction port regions, and transparent regions besides the light extraction port regions; each of the light extraction port regions is provided with one of the light extraction gratings, the light extraction gratings are configured to take out the light in the light guide plate; the transparent regions are configured to transmit light in the light guide plate by total reflection; and the protective layer is at least arranged in the transparent regions. In the display panel provided by the embodiments of the present disclosure, by arranging the protective layer between the film layer where the light extraction gratings are located and the light guide plate, in the process of forming patterned light extraction gratings by using an etching process, the protective layer can protect the light guide plate, so that the loss of light energy caused by the etching of the light guide plate can be avoided, the display contrast is increased. In addition, because the protective layer is transparent, the protective layer will not affect the normal light emission of the display panel.

The following points should be noted:
1) The accompanying drawings involve only the structure (s) in connection with the embodiment(s) of the present disclosure, and other structure(s) can be referred to common design(s).

2) Without conflicting with each other, features in one embodiment or in different embodiments can be combined to obtain new embodiment(s), the new embodiment(s) shall also belong to the scope of the present disclosure.

The described above is only the exemplary embodiments of the present disclosure, and the scope of the present disclosure is not limited thereto. A person of ordinary skill in the art can make various changes and modifications without departing from the technical scope of the embodiments of the present disclosure, and such changes and modifications shall fall into the scope of the present disclosure.

What is claimed is:

1. A display panel, comprising:
    a light guide plate;
    an array substrate opposite to the light guide plate;
    a liquid crystal layer located between the light guide plate and the array substrate;
    a plurality of light extraction gratings located on a side of a light-emitting surface of the light guide plate;
    a transparent protective layer located between a film layer where the light extraction gratings are located and the light guide plate;
    wherein the light guide plate comprises a plurality of light extraction port regions, and transparent regions beside the light extraction port regions;
    each of the light extraction port regions is provided with one of the light extraction gratings, the light extraction gratings are configured to take out light in the light guide plate; the transparent regions are configured to transmit light in the light guide plate by total reflection;
    the protective layer is at least arranged in the transparent region; and
    the protective layer is an etching barrier layer, and the etching barrier layer has an etching selection ratio greater than an etching selection ratio of the light extraction gratings, and the display panel further comprises a planarization layer covering each of the light extraction gratings and regions outside the light extraction gratings, the planarization layer is a resin layer, the protective layer has a refractive index greater than a refractive index of the light guide plate, and the planarization layer has a refractive index less than the refractive index of the light guide plate; or
    the protective layer is a resin layer, and the display panel further comprises a planarization layer covering each of the light extraction gratings and regions outside the light extraction gratings, the planarization layer has a refractive index less than a refractive index of the light guide plate, and the protective layer has a refractive index same as the refractive index of the planarization layer.

2. The display panel according to claim 1, wherein the protective layer has a thickness t of 0 nm<t≤400 nm.

3. The display panel according to claim 1, wherein the protective layer has a thickness t of 0 nm<t≤60 nm.

4. The display panel according to claim 1, wherein the protective layer made of a material same as a material of the planarization layer.

5. The display panel according to claim 1, wherein the refractive index of the protective layer is in a range of 1.2 to 1.3.

6. The display panel according to claim 1, wherein the protective layer has a thickness t of 0 nm<t≤10 nm.

7. The display panel according to claim 1, further comprising a light shielding layer,
    wherein the light shielding layer is located on a side of the array substrate near the liquid crystal layer,
    the light shielding layer comprises a plurality of light shielding units, and
    the light shielding units correspond to the light extraction gratings one by one, and the light shielding units are configured to shield light emitted from light-emitting surfaces of the light extraction gratings when no voltage is applied to the liquid crystal layer.

8. A method of manufacturing the display panel according to claim 1, comprising:
    providing a light guide plate, wherein the light guide plate comprises: a plurality of light extraction port regions, and transparent regions beside the light extraction port regions;
    forming a protective layer at least covering the transparent regions on a side of the light-emitting surface of the light guide plate;
    forming a grating film layer in the light extraction port regions and the transparent regions on a side of the protective layer facing away from the light guide plate; and
    patterning the grating film layer, removing a portion of the grating film layer located in the transparent regions, and retaining a portion of the grating film layer located only in the light extraction port regions as a light extraction grating.

9. The manufacturing method according to claim 8, wherein the protective layer is an etching barrier layer, and the forming the protective layer at least covering the transparent regions on the side of the light-emitting surface of the light guide plate comprises:
    using a material with an etching selection ratio greater than an etching selection ratio of the light extraction grating, and forming the etching barrier layer covering at least the transparent regions on a side of the light-emitting surface of the light guide plate;
    the forming the grating film layer in the light extraction port regions and the transparent regions on the side of the protective layer facing away from the light guide plate comprises:
    forming the grating film layer in the light extraction port regions and the transparent regions on the side of the etching barrier layer away from the light guide plate;
    the patterning the grating film layer, removing the portion of the grating film layer located in the transparent regions, and retaining the portion of the grating film layer located only in the light extraction port regions as the light extraction grating comprises:
    using a mask to shield the portion of the grating film layer located in the light extraction port regions, and removing the portion of the grating film layer located in the transparent regions by using an etching process.

10. The manufacturing method according to claim 9, further comprising: after patterning the grating film layer, using a resin material to form the etching barrier layer covering the transparent regions and the planarization layer covering each of the light extraction gratings.

11. The manufacturing method according to claim 8, wherein the protective layer is a resin layer;
    the forming the protective layer at least covering the transparent regions on the side of the light-emitting surface of the light guide plate comprises:
    using a resin material to form a resin layer covering at least the transparent regions on the side of the light-emitting surface of the light guide plate;

the forming the grating film layer in the light extraction port regions and the transparent regions on the side of the protective layer facing away from the light guide plate comprises:
  forming a grating film layer in the light extraction port regions and the transparent regions on a side of the resin layer facing away from the light guide plate;
  the patterning the grating film layer, removing the portion of the grating film layer located in the transparent regions, and retaining the portion of the grating film layer located only in the light extraction port regions as the light extraction grating comprises:
  using a mask to shield the portion of the grating film layer located at the light extraction port regions, using an etching process to remove the portion of the grating film layer located in the transparent regions, and forming a plurality of grooves on a surface of the resin layer during the etching process.

12. The manufacturing method according to claim 11, further comprising: after patterning the grating film layer, using a material with a same refractive index as the resin layer to form a planarization layer on the side of the light extraction grating facing away from the light guide plate to fill each of the grooves.

13. A display device, comprising a display panel, wherein the display panel comprises:
  a light guide plate;
  an array substrate opposite to the light guide plate;
  a liquid crystal layer located between the light guide plate and the array substrate;
  a plurality of light extraction gratings located on a side of a light-emitting surface of the light guide plate;
  a transparent protective layer located between a film layer where the light extraction gratings are located and the light guide plate;
  wherein the light guide plate comprises: a plurality of light extraction port regions, and transparent regions beside the light extraction port regions;
  each of the light extraction port regions is provided with one of the light extraction gratings, the light extraction gratings are configured to take out light in the light guide plate; the transparent regions are configured to transmit light in the light guide plate by total reflection;
  the protective layer is at least arranged in the transparent regions; and
  the protective layer is an etching barrier layer, and the etching barrier layer has an etching selection ratio greater than an etching selection ratio of the light extraction gratings, and the display panel further comprises a planarization layer covering each of the light extraction gratings and regions outside the light extraction gratings, the planarization layer is a resin layer, the protective layer has a refractive index greater than a refractive index of the light guide plate, and the planarization layer has a refractive index less than the refractive index of the light guide plate; or
  the protective layer is a resin layer, and the display panel further comprises a planarization layer covering each of the light extraction gratings and regions outside the light extraction gratings, the planarization layer has a refractive index less than a refractive index of the light guide plate, and the protective layer has a refractive index same as the refractive index of the planarization layer.

14. The display device according to claim 13, wherein the protective layer has a thickness t of 0 nm<t≤400 nm.

15. The display panel device according to claim 13, wherein the protective layer has a thickness t of 0 nm<to t≤60 nm.

* * * * *